United States Patent Office 3,310,416
Patented Mar. 21, 1967

3,310,416
AQUEOUS DISPERSIONS
Luzius Schibler, Riehen, Switzerland, assignor to Ciba Limited, Basel, Switzerland, a Swiss company
No Drawing. Filed Feb. 11, 1964, Ser. No. 343,946
Claims priority, application Switzerland, May 3, 1963, 2,500/63
4 Claims. (Cl. 106—285)

The present invention relates to aqueous dispersions of water-insoluble substances, containing as dispersants water-soluble, curable ethers of methylolmelamines or methylolureas whose methylol groups are etherified with monohydric alcohols containing 4 to 7 carbon atoms and with polyethyleneglycols.

The dispersants of the kind defined, present in the aqueous dispersions may be prepared by known methods, for example from formaldehyde condensation products of melamine or urea, monohydric alcohols containing 4 to 7 carbon atoms [such, for example as amyl alcohols, hexanol-(1),2-ethyl-butanol-(1), benzyl alcohol or especially n-butanol] and polyethyleneglycols. Preferred polyethyleneglycols are those of a molecular weight from 600 to 20,000, especially from 1000 to 5000.

Suitable water-soluble, curable ethers of methylolmelamines whose methylol groups are etherified exclusively with n-butanol and with polyethyleneglycols, can be prepared, for example, by first converting 1 mol of melamine with 3 to 6 mols of formaldehyde in known manner into the corresponding polymethylolmelamines, then etherifying at least some of the methylol groups with n-butanol and finally reacting the resulting etherification products by heating to an elevated temperature of about 95 to 100° C. under vacuum (for example of 15 to 20 mm. Hg), preferably in the presence of a small amount of acid, such as acetic, with the polyethyleneglycol. A particularly advantageous method for the manufacture of water-soluble mixed ethers of the above kind consists essentially in using as starting material, for example, a polymethylolmelamine butyl ether containing several btuyl ether groups and converting some of these butyl ether groups into polyglycol ether groups by heating the butyl ether with the polyethyleneglycol to about 95 to 100° C. under vacuum; this can be represented, for example, by following scheme of reactions

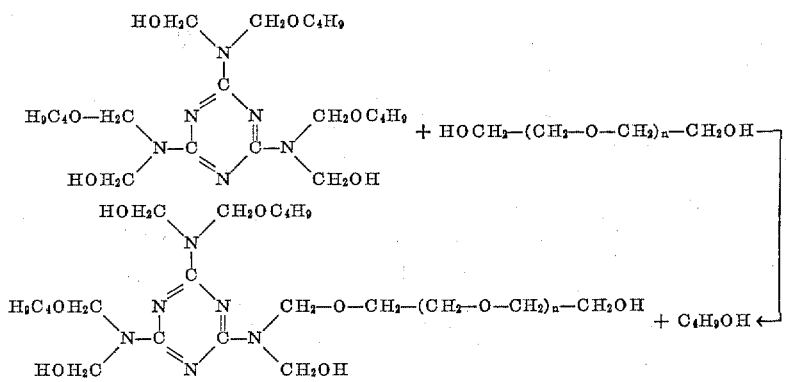

Water-soluble methylolurea mixed ethers can be manufactured in similar manner, for example, according to the following scheme of reactions:

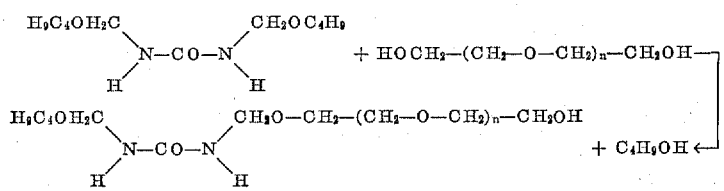

The aqueous dispersions are prepared in the conventional way, for example by dissolving the water-soluble, curable mixed ethers of the kind defined, to be used as disperant, in water and finely dispersing the water-insoluble substances, which may be solid or semi-solid or in the form of liquids, in the aqueous solution of the dispersant. Alternatively, the afore-mentioned dispersants may first be mixed with the substances to be dispersed, the resulting mixtures then being converted into aqueous dispersions.

As examples of water-insoluble substances that can be converted into aqueous dispersions with the aid of the said mixed ethers there may be mentioned:

Oils, fats, waxes, polysiloxanes; water-insoluble organic solvents of widely different kinds, more especially liquid (possibly chlorinated) aliphatic, aromatic or cycloaliphatic hydrocarbons, for example those which boil between 70 and 250° C., such as lacquer benzine, heavy gasoline, petroleum, benzene, toluene, xylenes, tetrahydronaphthalene, decahydronaphthalene, di-, tri- and tetrachloroethane, monochlorobenzene, commercial mixtures of hydrocarbons such as kerosene, solvent naphtha and white spirit, or liquids such as dipentene and terpenes; natural resins and especially synthetic resins, for example epoxy resins, polyester resins, alkyd resins, polyamides, polyurethanes, acetylcellulose, nitrocellulose, homopolymers and copolymers of compounds containing the grouping —CH=C<, aldehyde resins such as condensation products of formaldehyde with phenol, urea or aminotriazines, pesticides, optical brighteners, solutions of these substances in organic solvents, as well as plasticisers such as dibutyl phthalate and especially organic and inorganic pigments such as copper phthalocyanines, vat dyestuffs, azo dyestuffs, carbon blacks, metal powders, titanium dioxide and lithopones.

Depending on the kind of water-insoluble substance to be dispersed, the use to which the aqueous dispersion is to be put and other factors, the amount of dispersant of the composition indicated above may vary within relatively wide limits. For dispersing solid, water-insoluble substances, for example pigments, there may be used, for every part by weight of the solid substance, about 0.5 to 2 or more parts by weight of the dispersant referred to, whereas for dispersing water-insoluble liquids, for example liquid hydrocarbons, there may be used, for example, for every 100 parts by weight of liquid, about 1 to 2 parts by weight of the mixed ether of the kind defined above.

The water-soluble, curable mixed ethers to be used as dispersants yield particularly valuable, stable aqueous dispersions suitable for a wide variety of uses, for example, paints and above all concentrated pigment pastes, emulsion thickeners, pigment dyeing liquors, pigment printing colours, dressings, adhesives, hydrophobising or coating agents for use in the textile, leather and paper industries.

Parts and percentages in the following examples are by weight.

EXAMPLE 1

10 parts of *dispersant A* (manufactured as described below) are dissolved in 290 parts of water and 700 parts of heavy gasoline are emulsified in this solution. A salve-like, stable emulsion thickener is obtained which is outstandingly suitable for the manufacture of pigment printing pastes.

When a finely dispersed pigment dyestuff, a polymer latex and a small amount of ammonium thiocyanate-curing catalyst are admixed with the above emulsion thickener, and a textile fabric is printed with the resulting paste, there are obtained after curing and steaming colour effects that are fast to boiling or washing respectively.

The *dispersant A* used in this example can be manufactured in the following manner:

100 parts of a butanolic solution (having a dry content of about 80%) of a hexamethylolmelamine butyl ether are heated with 100 parts of polyethyleneglycol of molecular weight 4000 in the presence of 5 parts of glacial acetic acid under a pressure of 20 mm. Hg at 95 to 100° C., until 25 parts of butanol have passed over and the product has become water-soluble. 6 parts of 30% sodium hydroxide solution are then added and the batch is stirred, left to itself for some length of time to cool, and the salt solution is separated, to yield a waxy, curable dispersant or emulsifier which is readily soluble in water.

EXAMPLE 2

30 parts of *dispersant B* (obtained as described below), are mixed with 38 parts of water and 32 parts of a copper phthalocyanine pigment in a ball mill and the whole is ground for several hours. A finely dispersed, stable pigment paste is obtained.

When this pigment paste is used for printing or dyeing a textile fabric in the presence of an acid-forming catalyst, for example ammonium chloride, and of a polyacrylic acid ester latex, and the fabric is then heated at an elevated temperature, colour effects are obtained that are fast to washing.

The *dispersant B* used in this example may be prepared in the following manner:

100 parts of a butanolic solution (having a dry content of about 75%) of a hexamethylolmelamine butyl ether are fused with 100 parts of a polyethyleneglycol of average molecular weight 1540. 5 parts of glacial acetic acid are added and the whole is heated under a vacuum of 15 to 20 mm. Hg for about 1½ hours at 95 to 100° C., with about 20 to 25 parts of butanol passing over. The reaction product has by then become water-soluble. It is mixed with 15 parts of 30% sodium hydroxide solution, the whole is stirred for 15 minutes and then allowed to cool. The reaction product solidifies to form a waxy substance that is readily soluble in water.

EXAMPLE 3

100 parts of titanium white (titanium dioxide, rutile modification) are dispersed in a solution of 80 parts of *dispersant C* (obtained as described below) in 300 parts of water, and the resulting pigment paste is thickened by emulsifying 510 parts of heavy gasoline in it. After addition of 10 parts of ammonium thiocyanate a stable paste ready for printing is obtained which is used for printing a rayon fabric. When the printed fabric has been heated for a few minutes at 100 to 150° C., a matting effect is obtained which is fast to washing.

The *dispersant C* used in this example can be manufactured in the following manner:

126 parts of melamine are heated with 600 parts of 30% formaldehyde at pH 8.2 for about ½ hour at 90° C. until the initially clear solution begins to turn turbid. 1000 parts of n-butanol and 8 parts of glacial acetic acid are added and the mixture is refluxed until the resin solution has once more become clear. Butanol and water are then distilled off on a descending condenser until the water has passed over completely and the distillate passes over clear in the cold. 800 parts of polyethylene glycol of molecular weight 4000 are then added, and the batch is further heated under vacuum at 90° C., with further amounts of butanol and water passing over. The batch is heated until a specimen of the reaction product gives a substantially clear solution in water. 18 parts of triethanolamine are added and the whole is stirred and cooled, to yield a colourless, waxy substance which is readily soluble in water.

EXAMPLE 4

125 parts of *dispersant D* (prepared as described below) are fused with 375 parts of product I (likewise prepared as described below), and the liquid mixture is introduced in 15 minutes in a ball mill into 500 parts of cold water. The resulting emulsion is initially thick and coarse and becomes finer and more thinly liquid as grinding is continued. After 1 hour a homogeneous, white paste is obtained.

When a textile fabric is impregnated with a liquor containing per litre 100 to 200 g. of this emulsion and 10 g. of ammonium thiocyanate, dried and heated for a few minutes at 140 to 150° C., a water-repellant dressing is obtained which is substantially fast to washing and dry-cleaning.

The *dispersant D* can be prepared thus:

100 parts of a polyethyleneglycol of molecular weight 4000 and 100 parts of a butanolic solution (having a dry content of about 75) of a hexamethylolmelamine butyl ether are condensed for 2 hours at 90° C. in the presence of 0.8 part of glacial acetic acid, during which 11 parts of butanol are distilled off under vacuum. 4 parts of triethanolamine are then added, and the mixture is stirred and allowed to cool, to yield a waxy, water-soluble colourless product.

Preparation of Product I 100 parts of a butanolic solution (having a dry content of about 75%) of a hexamethylolmelamine butyl ether are heated with 100 parts of stearyl alcohol in the presence of 3 parts of glacial acetic acid, to yield 29 parts of butanol and as residue 174 parts of a water-insoluble, strongly hydrophobic, waxy substance which is stirred in the molten state with 7.5 parts of triethanolamine, whereupon Product I is obtained.

EXAMPLE 5

50 parts of *dispersant E* (prepared as described below) are dissolved in 100 parts of water, and this solution is used to emulsify 100 parts of a butanolic solution (having a dry content of about 75%) of a dimethylolurea n-butyl ether. A finely dispersed, stable resin emulsion is obtained which on addition of a small amount of ammonium thiocyanate dries to form a film which is stable towards water and can be used as adhesive and bonding agent.

The *dispersant E* used in this example can be manufactured thus:

120 parts of a polyethyleneglycol of molecular weight 1540 are heated with 120 parts of a butanolic solution (having a dry content of about 75%) of a dimethylolurea n-butyl ether for 45 minutes under vacuum at 100° C. In addition to 16 parts of butanol there are obtained 224 parts of a colourless, waxy, water-soluble, curable product (=dispersant E).

EXAMPLE 6

In 50 parts of a 50% aqueous solution of *dispersant F* (prepared as described below) there are emulsified 50 parts of a 20% solution of a copolymer from 65 parts of n-butyl acrylate, 30 parts of vinyl acetate and 5 parts of acrylic acid in a mixture of 3 parts of ethyl acetate and 5 parts of toluene. 100 parts of a stable, salve-like emulsion are obtained.

The above emulsion is mixed with 100 parts of water and 1.5% ammonium chloride curing catalyst (referred to the weight of the *dispersant F*). The resulting dressing liquid is used for impregnating a cotton fabric which is then dried and cured at 140 to 150° C., whereupon a stiffening effect is obtained which is fast to washing.

The *dispersant F* used in this example can be prepared thus:

200 parts of a butanolic solution (having a dry content of about 75%) of a hexamethylolmelamine butyl ether are mixed with 40 parts of 2-ethylbutanol, 2 parts of glacial acetic acid and 200 parts of polyethyleneglycol of molecular weight 4000. The whole is heated under a vacuum of 15 to 20 mm. Hg at 80° C. until 30 parts of butanol have passed over, then refluxed until the product has turned water-soluble (=dispersant F).

The mixed ether formed is dissolved in an equal amount of water and the solution is adjusted with triethanolamine to a pH value of 7 to 8.

EXAMPLE 7

240 parts of titanium dioxide and 60 parts of kaolin are dispersed in a solution of 2 parts of sodium ethylenediamine tetraacetate in 183 parts of water and 100 parts of a 50% aqueous solution of *dispersant G* (prepared as described below) by being twice ground in a paint mill. On addition of 5 parts of pine oil, 10 parts of dibutyl phthalate and 400 parts of a 50% aqueous dispersion of a copolymer from 60 parts of acrylic acid butyl ester, 38 parts of acrylonitrile and 2 parts of acrylic acid a paint is obtained which, after having been catalysed with 10 parts of ammonium nitrate, forms a paint coat which is stable to water and atmospheric attacks.

The *dispersant G* used in this example can be prepared thus:

63 parts of melamine are dissolved with gentle heating in 300 parts of a 30% aqueous formaldehyde solution (pH 8.1). 500 parts of benzyl alcohol are added, and 540 parts of a mixture of benzyl alcohol and water are distilled off while heating under vacuum. 200 parts of polyethyleneglycol of molecular weight 4000 (Carbowax 4000) and 4 parts of acetic acid are added and the whole is refluxed until the product has become water-soluble (=dispersant G). The mixed ether thus obtained is dissolved in an equal amount of water, and the solution is rendered neutral with triethanolamine.

What is claimed is:

1. An aqueous dispersion of at least one water-insoluble substance the latter being dispersed by means of an effective amount of, as a dispersant, at least one member selected from the group consisting of (a) water-soluble, curable ethers of methylolmelamines, of which up to 5 methylol groups are etherified with monohydric alcohols having from 4 to 7 carbon atoms and at least one methylol group is etherified with polyethyleneglycols of a molecular weight from 600 to 20,000, and (b) water-soluble, curable ethers of methylolureas, of which up to 3 methylol groups are etherified with monohydric alcohols having from 4 to 7 carbon atoms and at least one methylol group is etherified with polyethyleneglycols of a molecular weight from 600 to 20,000.

2. An aqueous dispersion as claimed in claim 1, of 1 part of at least one pigment, the latter being dispersed by means of 0.5 to 2 parts or more of at least one water-soluble, curable ether of a methylolmelamine, of which up to 5 methylol groups are etherified with n-butanol and at least one methylol group is etherified with polyethyleneglycols of a molecular weight from 1000 to 5000.

3. An aqueous dispersion as claimed in claim 1, of 100 parts of at least one liquid hydrocarbon the latter being dispersed by means of 1 to 2 parts of at least one water-soluble, curable ether of a methylolmelamine, of which up to 5 methylol groups are etherified with n-butanol and at least one methylol group is etherified with polyethyleneglycols of a molecular weight from 1000 to 5000.

4. An aqueous dispersion as claimed in claim 1, of at least one pigment and at least one liquid hydrocarbon the latter being dispersed by means of an effective amount of, as a dispersant, at least one water-soluble, curable ether of a methylolmelamine, of which up to 5 methylol groups are etherified with n-butanol and at least one methylol group is etherified with polyethyleneglycols of a molecular weight from 1000 to 5000.

No references cited.

LEON D. ROSDOL, *Primary Examiner.*

R. D. LOVERING, *Assistant Examiner.*

UNITED STATES PATENT OFFICE
CERTIFICATE OF CORRECTION

Patent No. 3,310,416                               March 21, 1967

Luzius Schibler

It is hereby certified that error appears in the above numbered patent requiring correction and that the said Letters Patent should read as corrected below.

In the heading to the printed specification, line 6, for "May 3, 1963" read -- February 27, 1963 --.

Signed and sealed this 28th day of November 1967.

(SEAL)
Attest:

Edward M. Fletcher, Jr.
Attesting Officer

EDWARD J. BRENNER
Commissioner of Patents